US012618960B2

(12) United States Patent
Song et al.

(10) Patent No.: US 12,618,960 B2
(45) Date of Patent: May 5, 2026

(54) DETECTOR FOR DETECTING CONTINUOUS WAVE SIGNAL AND METHOD FOR DETECTING CONTINUOUS WAVE SIGNAL OF DETECTOR

(71) Applicant: BG T&A CO., Gunpo-si (KR)

(72) Inventors: Chi Hyung Song, Yongin-si (KR); Jun Yeong Hong, Siheung-si (KR)

(73) Assignee: BG T&A CO., Gunpo-si (KR)

( * ) Notice: Subject to any disclaimer, the term of this patent is extended or adjusted under 35 U.S.C. 154(b) by 377 days.

(21) Appl. No.: 18/344,112

(22) Filed: Jun. 29, 2023

(65) Prior Publication Data

US 2024/0019564 A1 Jan. 18, 2024

(30) Foreign Application Priority Data

Jul. 15, 2022 (KR) ........................ 10-2022-0087407

(51) Int. Cl.
*G01S 13/34* (2006.01)
*G01S 13/524* (2006.01)
(52) U.S. Cl.
CPC .......... *G01S 13/34* (2013.01); *G01S 13/5246* (2013.01)
(58) Field of Classification Search
CPC ...... G01S 13/34; G01S 13/5246; G01S 7/021; G01S 7/022
See application file for complete search history.

(56) References Cited

U.S. PATENT DOCUMENTS

| | | | | | |
|---|---|---|---|---|---|
| 4,392,248 | A | * | 7/1983 | Eckels ................... | H04H 20/31 |
| | | | | | 455/161.3 |
| 4,479,255 | A | * | 10/1984 | Geesen .................... | H03G 3/20 |
| | | | | | 455/226.2 |
| 4,583,231 | A | * | 4/1986 | Puckette .............. | H04B 1/7136 |
| | | | | | 375/E1.034 |
| 4,698,632 | A | | 10/1987 | Baba et al. | |
| 5,465,414 | A | * | 11/1995 | Moskaluk ................ | H03D 7/00 |
| | | | | | 455/313 |
| 12,231,135 | B1 | * | 2/2025 | Li ........................... | H03L 7/113 |
| 2005/0249266 | A1 | * | 11/2005 | Brown ................... | H04K 3/224 |
| | | | | | 375/E1.033 |
| 2007/0149155 | A1 | * | 6/2007 | Jorgenson ............ | H04B 17/382 |
| | | | | | 455/263 |

(Continued)

FOREIGN PATENT DOCUMENTS

| | | | | | |
|---|---|---|---|---|---|
| KR | 10-1736407 | B1 | | 5/2017 | |
| KR | 20170110546 | A | * | 10/2017 | ............. G01S 7/021 |
| KR | 10-2310372 | B1 | | 10/2021 | |

OTHER PUBLICATIONS

Park et al, Translation of KR-20170110546-A, Oct. 11, 2017 (Year: 2017).*

*Primary Examiner* — Lewis G West

(57) ABSTRACT

A method for detecting a continuous wave signal of a detector according to an embodiment of the present disclosure includes: moving a local signal frequency, processing external signals based on the local signals, checking the local signal frequency in which a frequency of the local signal that causes the processing signals having a frequency of a detection band, fixing the frequency of the local signal with the frequency checked, discriminating the external signals in which the detected external signals are discriminated as any one of a continuous wave signal and a frequency modulation signal and notifying target signal detection.

12 Claims, 11 Drawing Sheets

(56)         References Cited

U.S. PATENT DOCUMENTS

| | | | |
|---|---|---|---|
| 2009/0079620 A1* | 3/2009 | Van Caekenberghe ...................... | G01S 13/536 342/200 |
| 2009/0286500 A1* | 11/2009 | Stengel ................ | H04B 1/1638 455/318 |
| 2011/0115672 A1* | 5/2011 | Lee ......................... | G01S 19/28 342/357.31 |
| 2016/0103204 A1* | 4/2016 | Valentine ................ | G01S 7/022 342/20 |
| 2017/0131394 A1* | 5/2017 | Roger ................... | G01S 13/343 |
| 2017/0285135 A1* | 10/2017 | Valentine ................ | G01S 7/022 |
| 2023/0243921 A1* | 8/2023 | Zoubi ................... | G01S 7/006 342/82 |

* cited by examiner

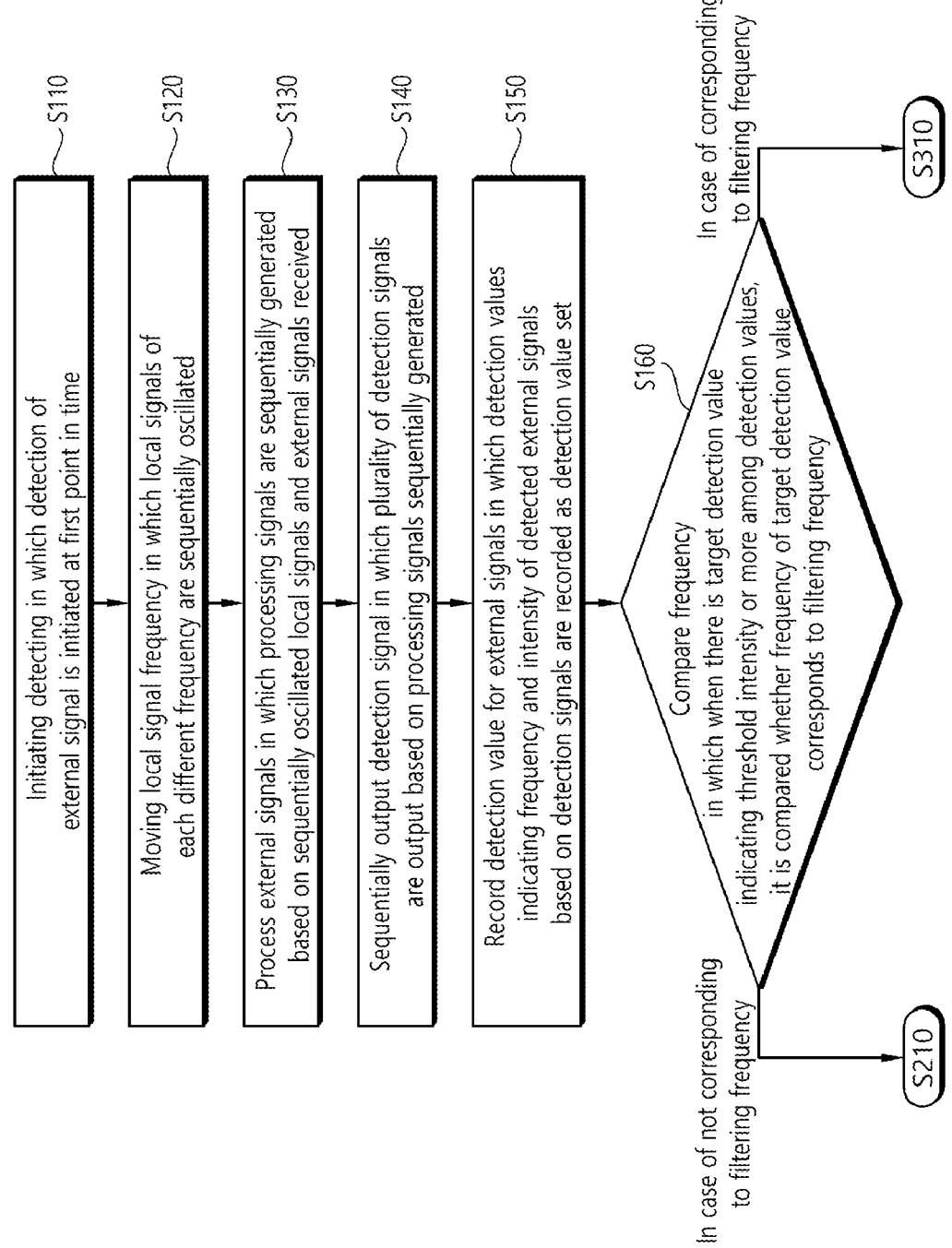

Initiating detecting in which detection of external signal is initiated at first point in time — S110

Moving local signal frequency in which local signals of each different frequency are sequentially oscillated — S120

Process external signals in which processing signals are sequentially generated based on sequentially oscillated local signals and external signals received — S130

Sequentially output detection signal in which plurality of detection signals are output based on processing signals sequentially generated — S140

Record detection value for external signals in which detection values indicating frequency and intensity of detected external signals based on detection signals are recorded as detection value set — S150

Compare frequency in which when there is target detection value indicating threshold intensity or more among detection values, it is compared whether frequency of target detection value corresponds to filtering frequency — S160

In case of not corresponding to filtering frequency — S210

In case of corresponding to filtering frequency — S310

FIG. 4

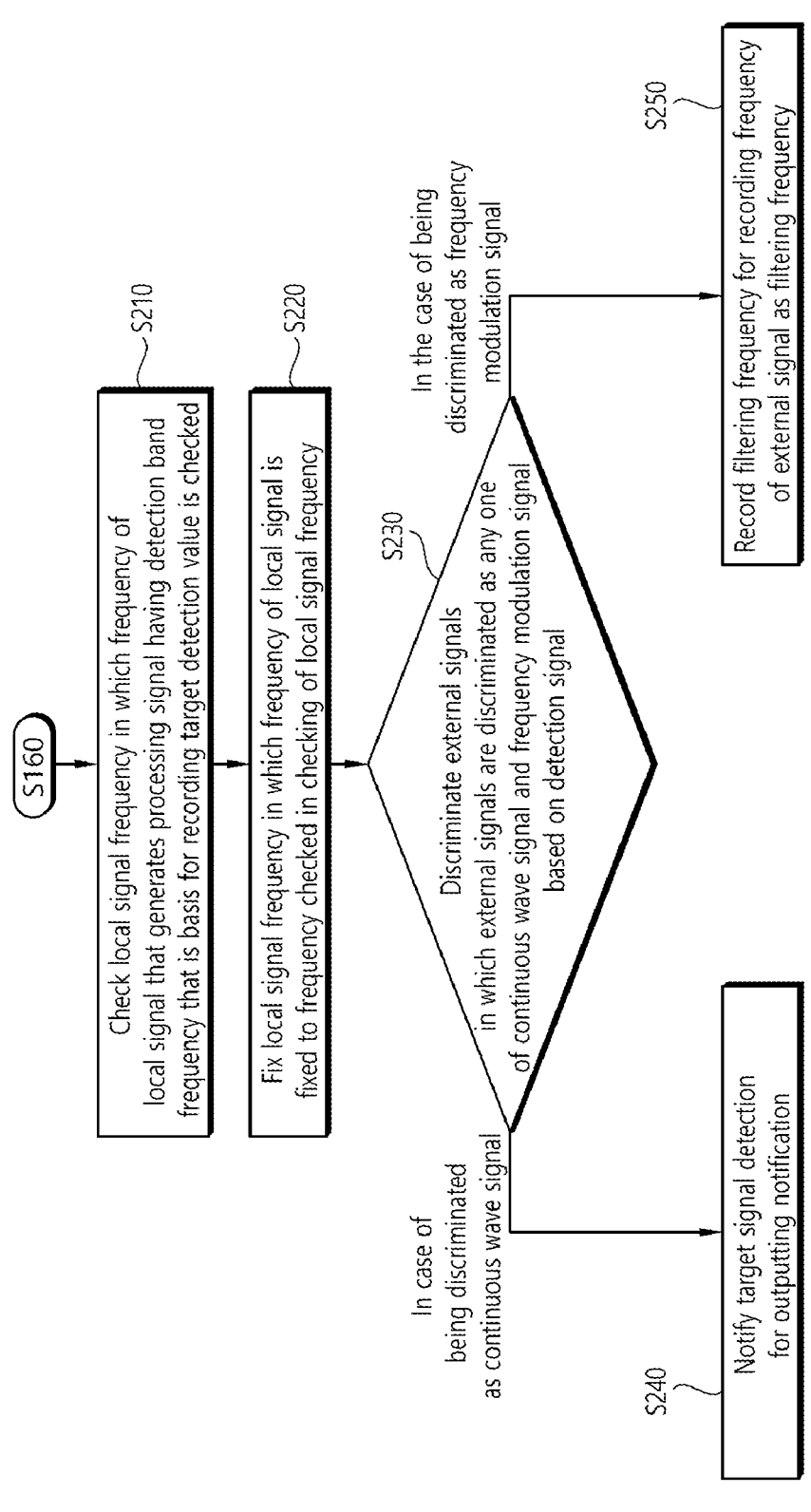

S160

S210
Check local signal frequency in which frequency of local signal that generates processing signal having detection band frequency that is basis for recording target detection value is checked S220
Fix local signal frequency in which frequency of local signal is fixed to frequency checked in checking of local signal frequency S230
Discriminate external signals in which external signals are discriminated as any one of continuous wave signal and frequency modulation signal based on detection signal In case of being discriminated as continuous wave signal In the case of being discriminated as frequency modulation signal S240
Notify target signal detection for outputting notification S250
Record filtering frequency for recording frequency of external signal as filtering frequency

DETECTOR FOR DETECTING CONTINUOUS WAVE SIGNAL AND METHOD FOR DETECTING CONTINUOUS WAVE SIGNAL OF DETECTOR

CROSS-REFERENCE TO RELATED APPLICATIONS

This application claims the benefit of Korean Patent Application No. 10-2022-0087407 filed on Jul. 15, 2022, the contents of which are all hereby incorporated by reference herein in their entirety.

TECHNICAL FIELD

The present disclosure relates to a detector for detecting a continuous wave signal and a method for detecting the continuous wave signal of the detector.

BACKGROUND

Conventional radio frequency signals are widely used as a method for inducing safe driving, such as being used in a speed gun to deliver various pieces of information to a vehicle or to measure the speed of a vehicle. As such radio frequency signals are used, the demand for detectors for detecting radio frequency signals is also naturally increasing.

In general, a detector receives a radio frequency signal transmitted from the outside and demodulates the received signal using various circuits. Then, based on the demodulated signal, it is determined whether the radio frequency signal has been received. The detector that determines that the radio frequency signal has been received may execute a subsequent operation according to its mounting purpose. For example, the detector may be configured to output a specific notification to a user.

Accordingly, the reliability of a detector depends on the validity of the determination about the signal to be detected. However, in modern society, signals are transmitted/received for various purposes, and as a result, detectors are also exposed to a lot of noise during operation. These noises are factors that cause malfunctions of the detector and lower reliability in particular.

In general, a signal to be received by a detector takes the form of a continuous wave. On the other hand, noise is often caused by a frequency shift keying (FSK) method or multiple frequency shift keying (MFSK) method. Since the frequency of this noise changes due to its characteristics, in one part of the cycle, the detector has a frequency of the band to be detected. When the noise has a frequency of the aforementioned band, the detector determines that a signal intended to be detected is received and may malfunction.

As an example, it is assumed that a detector is configured to detect continuous wave signals of X band (approximately, 10 GHz band), K band (approximately 24 GHz band), and Ka band (approximately, 34 GHz band). These detectors often cause malfunctions due to noise from collision avoidance systems (CAS, K-band) of automobiles, and minor lobes and side lobes of cell towers.

SUMMARY

An aspect of the present disclosure is directed to providing a detector capable of distinguishing between a continuous wave signal and a frequency modulation signal.

In addition, an aspect of the present disclosure is directed to providing a method for the detector to distinguish between a continuous wave signal and a frequency modulation signal.

The aspects of the present disclosure are not limited to those mentioned above, and other aspects not mentioned herein will be clearly understood by those skilled in the art from the following description.

A method for detecting a continuous wave signal of the detector according to an embodiment of the present disclosure includes: moving a local signal frequency in which the detector sequentially oscillates local signals of each different frequency; processing external signals in which processing signals are sequentially generated based on the sequentially oscillated local signals and the external signals sequentially received during the movement of the local signal frequency; checking the local signal frequency in which a frequency of the local signal that causes the processing signals, among the processing signals sequentially generated, having a frequency of a detection band detected by the detector to be generated is checked; fixing the frequency of the local signal with the frequency checked in the checking of the local signal frequency; discriminating the external signals in which a detection signal is output based on the processing signals having the frequency of the detection band, and the detected external signals are discriminated as any one of a continuous wave signal and a frequency modulation signal based on the detection signal; and notifying target signal detection outputting a notification based on the discrimination that the detected external signals are continuous wave signals.

The detection signal may have an intensity value based on a frequency of the processing signals.

The discrimination of the external signals may include filtering the frequency modulation signal discriminating the external signals as the frequency modulation signal when the intensity value of the detection signal is changed equal to or lower than a preset threshold value.

The detection signal may have a first intensity value based on the frequency of the processing signals and a second intensity value lower than the first intensity value.

The discrimination of the external signals may include filtering the frequency modulation signal discriminating the external signals as the frequency modulation signal based on a difference between a cycle in which the intensity value of the detection signal becomes the first intensity value and a cycle in which the intensity value of the detection signal becomes the second intensity value.

There may be further included: sequentially outputting the detection signal in which a plurality of the detection signals are output based on the processing signals sequentially generated in the processing of the external signals; and recording a detection value for the external signals in which a plurality of detection values indicating a frequency and intensity of any one of the detected external signals, respectively, based on each of the plurality of detection signals, and a detection value set including the plurality of detection values are recorded.

The discrimination of the external signals may further include: recording a comparative detection value in which a new detection value set is recorded by repeating the movement of the local signal frequency, the processing of the external signals, the sequential outputting of the detection signal, and the recording of the detection value for the external signals; and discriminating a signal based on the detection value of comparing the detection value set with the new detection value set and discriminating the detected external signals as any one of the continuous wave signal and the frequency modulation signal.

In the discrimination of the signal based on the detection value, when a first frequency of the detected external signals having a maximum intensity in the detection value set differs from a second frequency of the detected external signals having a maximum intensity in the new detection value set, at least one of the detected external signals having the first frequency and the detected external signals having the second frequency may be discriminated as the frequency modulation signal.

In the discrimination of the signal based on the detection value, when an average intensity of the detection value set differs from an average intensity of the new detection value set, and a maximum intensity in the detection value set differs from a maximum intensity in the new detection value set, in the detection value set and the new detection value set, the detected external signals having an intensity equal to or higher than a preset threshold intensity may be discriminated as the frequency modulation signal.

When the detected external signals are not discriminated as the frequency modulation signal in the filtering of the frequency modulation signal, the discrimination of the external signals may further include deciding whether to execute an additional determination determining whether the discrimination of the signal based on the detection value is necessary.

When the number of detection values indicating an intensity equal to or higher than a preset threshold intensity among the plurality of detection values is plural, the decision of whether to execute the additional determination may determine that the discrimination of the signal based on the detection value is necessary.

When an average intensity of the detection value set is equal to or higher than a preset reference average intensity, the decision of whether to execute the additional determination may determine that the discrimination of the signal based on the detection value is necessary.

In the discrimination of the external signals, the external signal may be discriminated as a continuous wave signal based on the determination that the discrimination of the signal based on the detection value is not necessary in the decision of whether to execute the additional determination.

There may be further included: recording a filtering frequency in which a frequency of the detected external signal discriminated as the frequency modulation signal is recorded as the filtering frequency; and filtering the external signals in which a newly detected external signal having the filtering frequency is discriminated as the frequency modulation signal.

There may be further included deleting the filtering frequency in which the recorded filtering frequency is deleted when the external signals of the filtering frequency are detected a preset number of times or more.

The detector for detecting a continuous wave signal according to an embodiment of the present disclosure includes: a receiver for receiving an external signal; a frequency oscillator for oscillating a local signal; a signal processing portion for generating a processing signal based on the local signal and the external signal; a signal detector for outputting a detection signal based on the processing signal when the processing signal has a frequency in a detection band; a control portion for controlling the frequency oscillator to sequentially change a frequency of the local signal in a preset band or fixing the frequency of the local signal to a frequency at which a frequency of the processing signal is the frequency in the detection band; a signal discrimination portion for discriminating the external signal as any one of a continuous wave signal and a frequency modulation signal based on the detection signal in a state in which the frequency of the local signal is fixed; and a notification portion for outputting a notification based on the discrimination that the external signal is the continuous wave signal.

Other details of the present disclosure are included in the detailed description and drawings.

According to embodiments of the present disclosure, at least the following benefits are provided.

It is possible to prevent a detector for detecting a continuous wave signal from being malfunctioned by a frequency modulation signal.

The benefits of the present disclosure are not limited thereto, and the disclosure encompass other various benefits.

BRIEF DESCRIPTION OF THE DRAWINGS

FIG. 1 is a block diagram for explaining the structure of a detector for detecting a continuous wave signal according to an embodiment of the present disclosure.

FIGS. 3, 4, 5, and 6 are flowcharts of a method for detecting a continuous wave signal of a detector according to an embodiment of the present disclosure.

DETAILED DESCRIPTION

Figure 2:
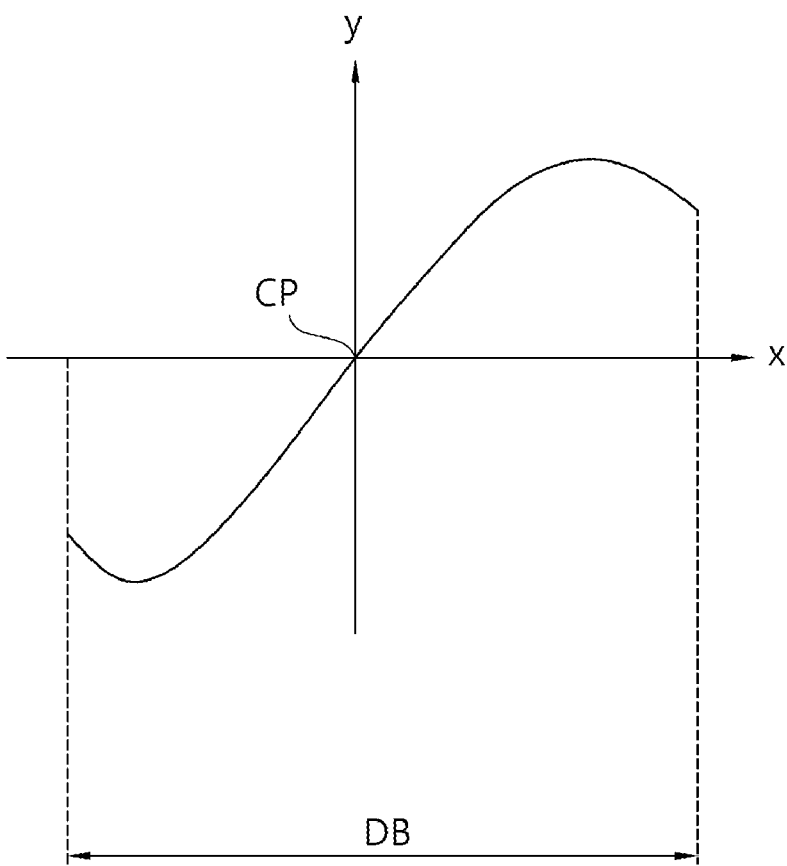
FIG. 2 is a graph representing the change in intensity of a frequency detection signal according to a frequency of a processing signal.

Advantages, features, and methods of accomplishing the same of the present disclosure will become apparent with reference to embodiments described in detail below together with the accompanying drawings. However, the present disclosure is not limited by embodiments disclosed hereinafter, and may be implemented in various forms. Rather, these embodiments are provided to so that this disclosure will be through and complete and will fully convey the scope of the present disclosure to those skilled in the technical field to which the present disclosure pertains, and the present disclosure will only be defined by the appended claims.

In addition, the embodiments described herein will be described with reference to cross-sectional diagrams and/or schematic diagrams, which are ideal exemplary views of the present disclosure. Accordingly, variations from the shapes of the exemplary diagrams as a result, for example, of manufacturing techniques and/or tolerances are to be expected. In addition, in each drawing illustrated in the present disclosure, each component may be illustrated somewhat enlarged or reduced in consideration of convenience of explanation. Like reference numerals designate like components throughout the specification.

The term "continuous wave signal" mentioned below is a signal in the form of a continuous wave, and may mean a signal whose frequency is not modulated with time. In addition, the term "frequency modulation signal" mentioned below is a signal whose frequency is modulated with time. For example, the frequency modulation signal may be a frequency shift key (FSK) signal, a multiple frequency shift key (MFSK) signal, or the like.

The term "sweep" mentioned below may mean that a frequency of a local signal is sequentially moved in a specific band. More specifically, the term "sweep" may mean moving the frequency of the local signal from a start frequency of a specific band to an end frequency. For example, for each specific cycle, the frequency of the local signal may be moved by a value obtained by dividing the spacing between a start frequency and an end frequency by a predetermined interval.

Hereinafter, the present disclosure will be described with reference to the drawings for explaining a detector for detecting a continuous wave signal and a method for detecting the continuous wave signal of the detector according to an embodiment of the present disclosure.

<Detector for Detecting Continuous Wave Signal>

Figure 1:
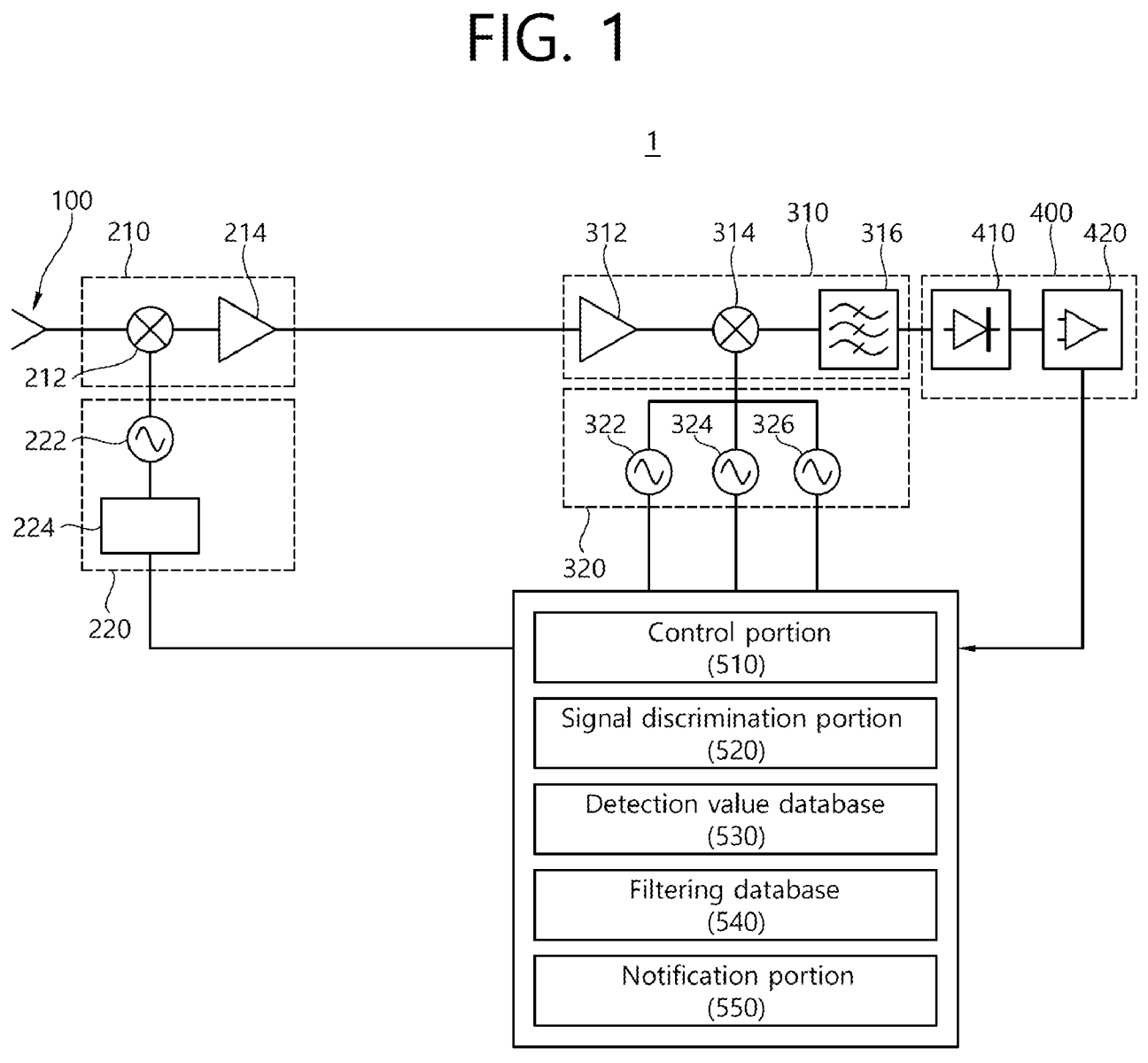

First, the detector for detecting the continuous wave signal according to an embodiment of the present disclosure will be described with reference to FIG. 1. FIG. 1 is a block diagram for explaining the structure of a detector for detecting a continuous wave signal according to an embodiment of the present disclosure.

As illustrated in FIG. 1, a detector 1 for detecting the continuous wave signal according to an embodiment of the present disclosure includes a receiver 100, signal processing portions 210 and 310, a first frequency oscillation portion 220, a second oscillation portion 320, a signal detector 400, and an information processing portion 500.

The receiver 100 may be configured as an antenna that receives a radio frequency signal (hereinafter referred to as "external signal") transmitted from an outside. As an example, the receiver 100 may be configured using a horn antenna, and various antenna structures such as a patch antenna may be used.

The received external signal may be applied to the signal processing portions 210 and 310 and converted into an intermediate frequency band (IF). In general, a radio frequency signal received by a radar detector has a high frequency of several tens of GHz or more, and the signal processing portions 210 and 310 may convert these high frequencies into signals in a frequency domain of several tens of MHz to several GHz.

More specifically, the signal processing portions 210 and 310 mix the received external signals with local signals generated by the first frequency oscillation portion 220 and the second frequency oscillation portion 320 and process the same. Thereby, the frequency of the external signal may be lowered by the frequency of the local signals.

Accordingly, the signal processing portions 210 and 310 may contribute to improving frequency selectivity and sensitivity in processing the received radio frequency signal.

These signal processing portions 210 and 310 may include a first signal processing portion 210 and a second signal processing portion 310. For convenience of explanation, the external signal down-converted by the signal processing portions 210 and 310 is referred to as a processing signal. In addition, among the processing signals, the signal processed by the first signal processing portion 210 is referred to as a first processing signal, and the signal processed by the second signal processing portion 310 is referred to as a second processing signal. Details of the first signal processing portion 210 and the second signal processing portion 310 will be described below together with the contents of the first frequency oscillation portion 220 and the second frequency oscillation portion 320.

The first frequency oscillation portion 220 and the second frequency oscillation portion 320 may include a frequency oscillator and oscillate a local signal. First, the first frequency oscillation portion 220 may include a first frequency oscillator 222 and a sweep oscillator 224. The first frequency oscillator 222 may generate a local signal (hereinafter referred to as a first local signal) corresponding to a predetermined frequency band. The generated first local signal may be delivered to the first signal processing portion 210.

By the sweeping operation of the sweep oscillator 224, the first frequency oscillator 222 may generate a first local signal in a preset fundamental frequency range [f1, f2]. In addition, the first frequency oscillator 222 may generate a first local signal corresponding to a harmonic wave of the fundamental frequency, for example, a frequency signal having a frequency range of [2f1, 2f2] and [3f1, 3f2].

In general, the frequency domain of a signal to be detected by an automotive radar detector mainly includes X band (8 to 12 GHz), K band (18 to 27 GHz), and Ka band (27 to 40 GHz). Among them, the frequencies used for vehicle speed measurement devices and road information provision in major countries such as the United States and Russia correspond to GHz in the X band, 24.150 GHz in the K band, and 33.4 to 36 GHz in the Ka band.

The fundamental frequencies [f1, f2] of the first local signal may be decided in consideration of various frequency bands to be received from the outside. For ease of understanding, it is assumed that the detector 1 aims to detect signals of the aforementioned X-band, K-band, and Ka-band. In this connection, the fundamental frequency [f1, f2] may be decided to correspond to the radio frequency signal of the X band, a first harmonic wave [2f1, 2f2] may be decided to correspond to the radio frequency signal of the K band, and a second harmonic wave [3f1, 3f2] may be decided to correspond to the radio frequency signal of the Ka band.

The frequency of the first local signal generated by the first frequency oscillator 222 may be swept in a band of the fundamental frequency [f1, f2], the first harmonic wave [2f1, 2f2], or the second harmonic wave [3f1, 3f2] by the sweep oscillator 224.

Accordingly, even when a radio frequency signal of any band among the X band, K band, and Ka band is received, the first local signal and the external signal are mixed through a first mixer 212, and consequently may be converted into a first processing signal having a frequency within a predetermined range.

For example, the first frequency oscillator 222 may be configured to have a fundamental frequency of 10.98 to 11.38 GHz. By the first mixer 212, the external signals of the X band, K band, and Ka band may be mixed with the fundamental frequency signal, a first harmonic wave signal, and a second harmonic wave signal of the first frequency oscillator 222, respectively, and may be processed into the first processing signal having an intermediate band frequency of 3 GHz or less.

However, the fundamental frequency of the first frequency oscillator 222 of this embodiment is merely an example, and may be designed in various ways in consideration of the frequency characteristics of a frequency signal to be detected.

The external signal down-converted into the first processing signal may be amplified by a first amplifier 214 included in the first signal processing portion 210 and applied to the second signal processing portion 310. The second signal processing portion 310 may be connected to the first amplifier 214 and the second frequency oscillation portion 320. The second signal processing portion 310 may down-convert the first processing signal applied from the first amplifier 214 by using a local signal (hereinafter referred to as a second local signal) applied from the second frequency oscillation portion 320. The second signal processing portion 310 may include a second amplifier 312, a second mixer 314, and a band pass filter 316.

The second amplifier 312 amplifies an output of the first processing signal converted by the first signal processing portion 210. The first processing signal amplified by the second amplifier 312 is delivered to the second mixer 314. The second mixer 314 may be connected to the second frequency oscillation portion 320, and a second local signal may be applied from the second frequency oscillation portion 320. The second mixer 314 may mix the applied first processing signal and the second local signal to be processed with the second processing signal. The second processing signal may be a signal obtained by down-converting the first processing signal using the second local signal.

The second frequency oscillation portion 320 may include a second frequency oscillator 322, a third frequency oscillator 324, and a fourth frequency oscillator 326. The connection of a plurality of frequency oscillators to the second mixer 314 may be for converting frequencies so that the aforementioned radio frequency signals of various bands may pass through one band pass filter 316.

Hereinafter, for convenience of description, among the second local signals, the signal oscillated by the second frequency oscillator 322 is referred to as a 2a local signal, the signal oscillated by the third frequency oscillator 324 is referred to as a 2b local signal, and the signal oscillated by the fourth frequency oscillator 324 is referred to as a 2c local signal. For example, the second frequency oscillator 322 of this embodiment may be configured to correspond to an X-band radio frequency signal, the third frequency oscillator 324 may be configured to correspond to a K-band radio frequency signal, and the fourth frequency oscillator 326 may be configured to correspond to a Ka band radio frequency signal.

When the radio frequency signal of the X band passes through the first signal processing portion 210 and the frequency is converted, the frequency is converted to be mixed with the 2a local signal oscillated by the second frequency oscillator 322 in the second mixer 314 and to pass through the band pass filter 316.

In addition, the radio frequency signals of the K band and the Ka band are similarly mixed with the 2b local signal oscillated by the third frequency oscillator 324 and the 2c local signal oscillated by the fourth frequency oscillator 326 in the second mixer 314, respectively, and the frequency is converted to pass through the band pass filter 316.

As an example, the second frequency oscillator 322 of this embodiment may be configured to generate a single frequency in the range of 500 to 600 MHz. In addition, the third frequency oscillator 324 may be configured to generate a single frequency in the range of 1500 to 1600 MHz. In addition, the fourth frequency oscillator 326 may be configured to generate a single frequency in the range of 2,000 to 2,200 MHz.

Since the detector 1 is designed to detect external signals of the X band, K band, and Ka band among continuous wave signals as an example, in the above description, a structure in which three frequency oscillators are connected to the second mixer 314 has been described. However, the present disclosure is not limited thereto, and the number of frequency oscillators connected to the second mixer 314 and the oscillation frequency of each frequency oscillator may be changed according to the purpose of the detector 1.

As such, the second processing signal whose frequency is converted through the second mixer 320 may pass through the band pass filter 316 that selectively passes only signals of a specific frequency band, and may be applied to the signal detector 400. In this connection, a specific frequency band (hereinafter, a detection band) may mean a band that the signal detector 400 may recognize.

When the frequency of an external signal is included in a frequency band (X band, K band, Ka band described above) (hereinafter referred to as detection band) targeted for detection, the second processing signal passing through the signal processing portions 210 and 310 may have a frequency of the detection band. Accordingly, when the signal detector 400 receives the second processing signal of the detection band, a signal of the detection band may be present outside.

The signal detector 400 may be configured to output a detection signal according to the characteristics of the second processing signal when the second processing signal of the detection band is delivered. The detection signal may include a frequency detection signal that changes based on the frequency of the second processing signal and an intensity detection signal that changes based on the intensity of the second processing signal.

The signal detector 400 may include a signal analyzer 410 and an AD converter 420. The second processing signal may be detected and/or demodulated by the signal analyzer 410 and provided to the AD converter 420, and the AD converter 420 may converts an analog signal into a digital form and provided to the information processing portion 500.

The signal analyzer 410 may include an FM demodulator for outputting a frequency detection signal and a Received Signal Strength Indicator (RSSI) circuit for outputting an intensity detection signal. Herein, the FM demodulator may include a Foster-seeley's circuit or a circuit similar thereto.

The analog signal output from an output terminal of the FM demodulator may be provided to the AD converter 420, converted into a frequency detection signal by the AD converter 420, output, and delivered to the information processing portion 500. As such or similarly, the analog signal output from the output terminal of the RSSI circuit may be provided to the AD converter 420, converted into an intensity detection signal by the AD converter 420, output, and delivered to the information processing portion 500.

The information processing portion 500 may be a computing unit that receives information from other configurations of the detector 1, processes necessary calculations, and controls other configurations. The information processing portion 500 may include a control portion 510, a signal discrimination portion 520, a detection value database 530, a filtering database 540, and a notification portion 550. Although the above configurations are distinguished in terms of their functions, in practice, a plurality of configurations may also be implemented by one computing chip and/or program.

The control portion 510 may be a component that controls other components of an embodiment of the present disclosure. In particular, the control portion 510 may control the first frequency oscillation portion 220 and the second frequency oscillation portion 320 to adjust an oscillated local signal.

For example, in an X-band search mode of the detector 1, the control portion 510 may control the first frequency oscillation portion 220 so that the first local signal is swept in the frequency band of the fundamental frequency, and may cause the second frequency oscillator 322 to oscillate the 2a local signal.

Similarly, in a K-band search mode of the detector 1, the control portion 510 may control the first frequency oscillation portion 220 so that the first local signal is swept in the frequency band of the first harmonic wave, and may cause the third frequency oscillator 324 to oscillate the 2b local signal.

Similarly, in a Ka-band search mode of the detector 1, the control portion 510 may control the first frequency oscillation portion 220 so that the first local signal is swept in the frequency band of the second harmonic wave, and may cause the fourth frequency oscillator 324 to oscillate the 2c local signal.

The control portion 510 may control the first frequency oscillation portion 220 and the second frequency oscillation portion 320 so that the detector 1 repeatedly performs the X-band search mode, the K-band search mode, and the Ka-band search mode in a preset order. In addition, each mode may be performed within a few microseconds.

As will be described later, the control portion 510 may control the first frequency oscillation portion 220 and the second frequency oscillation portion 320 to output local signals of specific frequencies, respectively, to fix the frequency of the local signal. For example, the frequency oscillator is a voltage controlled oscillator, and the control portion 510 may change the frequency of the local signal by adjusting the voltage applied to each frequency oscillator. In addition, although not illustrated, the detector 1 may include a phase lock loop (PLL) circuit so that the frequency oscillator may oscillate at a constant frequency under the control of the control portion 510.

The signal discrimination portion 520 may be set to discriminate an external signal as one of a continuous wave signal and a frequency modulation signal based on the detection signal. The frequency detection signal and the intensity detection signal output by the AD converter 420 may be delivered to the signal discrimination portion 520, and the signal discrimination portion 520 may determine an external signal based thereon. In addition, the signal discriminating portion 520 may record the detection values (described later) identified as the frequency detection signal and the intensity detection signal in the detection value database 530. A method for discriminating a signal by the signal discriminating portion 520 will be described later in detail after describing a method for detecting a continuous wave signal of a detector according to an embodiment of the present disclosure.

A detection value based on the detection signal may be recorded in the detection value database 530. The detection value may be information indicating information about a frequency value and an intensity value of an external signal identified based on the detection signal.

Herein, the frequency value of an external signal may be identified based on the signal output from the FM demodulator. In more detail, the signal discrimination portion 520 may identify the frequency of the second processing signal in consideration of the relationship between the frequency and the intensity value of the frequency detection signal. Thereafter, the signal discriminating portion 520 may identify the frequencies of the first local signal and the second local signal, and calculate the frequency of the external signal based thereon. The frequency value of the external signal identified in this way may be recorded in the detection value database 530.

Similarly, the intensity value of the external signal may be identified based on the signal output from the RSSI circuit. The RSSI circuit may output a voltage value according to the amplitude of the received second processing signal, and the signal discrimination portion 520 may calculate an intensity value of an external signal based on this voltage value. The intensity value of the external signal identified in this way may be recorded in the detection value database 530.

More specifically, a plurality of detection values may be recorded in the detection value database 530 based on detection signals output while the local signal sweeps the detection band once. In this connection, a plurality of detection values recorded during one sweep may be recorded as one detection value set.

As described above, the control portion 510 may control the first frequency oscillation portion 220 and the second frequency oscillation portion 320 to repeat the sweep operation. Thus, a plurality of detection value sets resulting from several sweep operations may be recorded in the detection value database 530. The recorded detection value set may be deleted from the oldest recorded detection value set whenever the capacity of data exceeds a predetermined capacity or the sweep operation is repeated a predetermined number of times.

The control portion 510 may be configured to identify frequencies of local signals currently oscillated by the first frequency oscillation portion 220 and the second frequency oscillation portion 320. When the detection signal is output, the information processing portion 500 uses the frequency identified by the control portion 510 to record the frequency of the first local signal and the frequency of the second local signal that are the bases of the output of the detection signal in the detection value database 530. The frequency of the first local signal and the frequency of the second local signal that are the bases of the output of the detection signa, may mean frequencies of local signals used to convert an external signal into a second processing signal in the detection band. The frequency of the first local signal and the frequency of the second local signal that are the bases of the output of the detection signal may be recorded together in association with the corresponding detection value.

The filtering database 540 may be a database in which filtering frequencies are recorded. The filtering frequency may be a frequency of a frequency modulation signal among external signals. In this connection, since the frequency modulation signal may have several frequencies, the filtering frequency may mean a frequency when the frequency modulation signal causes the detector 1 to output the second processing signal of the detection band. A detailed method of determining a filtering frequency will be described later in the description of a method for detecting a continuous wave signal of a detector according to an embodiment of the present disclosure.

The recorded filtering frequency may be deleted when a signal of the corresponding frequency is received more than a predetermined number of times (hereinafter, the number of repeated receptions). This may be because, when a signal corresponding to the filtering frequency is continuously received even after a vehicle is freed from the influence of noise, there is a high possibility that a continuous wave signal corresponding to the filtering frequency is present outside.

In this connection, since the continuous wave signal continues to have a constant frequency, it may be continuously detected during repeated sweeps. Accordingly, when the external signal corresponding to the filtering frequency signal is a continuous wave signal, the number of repeated receptions may be quickly counted. In contrast, since the frequency modulation signal is continuously modulated in frequency during repeated sweep operations, even when it is actually generated as noise outside a vehicle, the number of repeated receptions may be counted at a relatively slow speed.

Accordingly, as will be described later, when a continuous wave signal having the same frequency as the filtering frequency is present, an alarm may be output within a short time after repeating sweeps. In this connection, the number of repeated receptions may be selected as the number of times to prevent an alarm from being output due to a frequency modulation signal. More specifically, the noise encountered while a vehicle is moving may leave the vehicle within a few seconds of its influence. Accordingly, when the experimentally identified time for which the vehicle escapes from the influence of noise and the time for counting the number of repeated receptions by the frequency modulation signal are similarly set, alarms caused by noise may be minimized.

The number of receptions for each filtering frequency may be recorded in the filtering database 540 together. The number of receptions is recorded once when the filtering frequency is first recorded, and may be recorded incrementally each time it is received. When the filtering frequency is received, the information processing portion 500 may increase the number of receptions of the corresponding frequency in the filtering database 540, and deletes the filtering frequency when the number of receptions reaches a preset number of repeated receptions.

The detection value database 530 and the filtering database 540 may be provided as a buffer memory for recording temporary data. However, the present disclosure is not limited thereto.

The notification portion 550 is a component that outputs a notification when the second processing signal of the detection band is output and the second processing signal is a continuous wave signal. In this connection, as described above, when the second processing signal of the detection band is output, the external signal may be a signal having a frequency of the detection band.

The notification portion 550 may be configured differently depending on how information is to be delivered to a user. For example, the notification portion 550 may include a display and output visual information as a notification. The visual information may visually inform that an external signal is present or visually inform the frequency of a received external signal. For example, visual information may be implemented in the form of text output on a screen.

Alternatively, for example, the notification portion 550 may include a speaker and output auditory information as a notification. The auditory information may be information that audibly informs the presence of an external signal outside or audibly informs the frequency of a received external signal.

Alternatively, the visual information and the auditory information may be expressed in different ways according to the detection purpose of the detector 1. For example, in response to reception of an external signal, pre-stored text and images may be output on a screen or pre-recorded sound may be output.

Hereinafter, based on the above description, a method for detecting a continuous wave signal of a detector according to an embodiment of the present disclosure will be described. For convenience of description, like reference numerals are used for the portions similar to the description of the detector 1, and the descriptions of common portions are omitted.

Prior to explaining the method for detecting the continuous wave signal of the detector according to an embodiment of the present disclosure, characteristics of the frequency detection signal will be described first for better understanding. FIG. 2 is a graph representing the change in intensity of a frequency detection signal according to a frequency of a processing signal.

<Characteristics of Frequency Detection Signal>

In FIG. 2, an X-axis may correspond to the frequency value of the second processing signal, and a Y-axis may correspond to the intensity value (for example, voltage level) of the detection signal. The intensity of the frequency detection signal output from the FM demodulator may change along an S-shaped graph as a whole with a center frequency (CP) of the second processing signal as a center point.

More specifically, when the frequency of the second processing signal is within a certain range around the center frequency (CP), the frequency detection signal may be output with an intensity proportional to the frequency value. In addition, when the frequency of the second processing signal is equal to or lower than a certain range, the intensity of the frequency detection signal is rather increased, and when it is equal to or higher than a certain range, the intensity may be decreased on the contrary.

In this connection, the range in which the graph is drawn in FIG. 2 may be the frequency range of the detection band DB. When the processing signal has a frequency outside the detection band DB, the detection signal may not be output because it is out of the recognition range of the signal detector 400.

<Method for Detecting Continuous Wave Signal of Detector>

Hereinafter, a method for detecting a continuous wave signal of a detector according to an embodiment of the present disclosure will be described with reference to FIGS. 3 to 6. FIGS. 3 to 6 are flowcharts of a method for detecting a continuous wave signal of a detector according to an embodiment of the present disclosure.

First, continuing the description with reference to FIG. 3, FIG. 3 is a flowchart from a detecting initiation stage to a frequency comparison stage. As illustrated in FIG. 3, the method for detecting the continuous wave signal of the detector according to an embodiment of the present disclosure may include: initiating detecting (S110), moving a local signal frequency (S120); processing an external signal (S130); sequentially outputting a detection signal (S140); recording a detection value for the external signal (S150); and comparing a frequency (S160).

In the initiation of the detecting (S110), a detector may be operated at a first point in time to be in a state capable of receiving and detecting an external signal. Herein, the detector may be provided with the detector 1 according to one embodiment of the present disclosure described above.

In the movement of the local signal frequency (S120), the local signal may be oscillated, and the frequency of the local signal may be sequentially moved in the detection band. Oscillation and frequency movement of these signals may be implemented under the control of the control portion 510.

For example, in this stage, an X-band search mode, a K-band search mode, and a Ka-band search mode may be cyclically executed. In addition, in this stage, an external signal may be received by the detector. Such an external signal may be continuously received by the receiver 100 after the first point in time.

Hereinafter, one sweep will be described assuming that the X-band search mode, the K-band search mode, and the Ka-band search mode are sequentially executed once. However, this is merely an example, and the present disclosure is not limited thereto.

In the processing of the external signal (S130), processing signals may be sequentially generated based on the sequentially oscillated local signals and the sequentially received external signals. In this connection, the sequentially received external signal may be a concept distinguished according to the frequency of the local signal when received. More specifically, since the first local signal is swept in a certain band, it may be a concept that distinguishes an external signal received when the first local signal is oscillated at a frequency a from an external signal received when oscillated at a frequency b different from the a frequency.

The processing signal generated in this stage may mean the second processing signal in the aforementioned embodiment. For example, this stage may be implemented by sequentially processing the sequentially received external signal into the second processing signal through the first mixer 212 and the second mixer 314.

In the sequential outputting of the detection signal (S140), the detection signal may be sequentially output by the sequentially processed processing signals (the second processing signal in the above example). More specifically, among the processing signals sequentially processed, a plurality of detection signals may be sequentially output by processing signals having a frequency of a detection band. The detection signal in this connection may include a frequency detection signal and an intensity detection signal.

In the recording of the detection value for the external signal (S150), a detected value indicating the characteristics of the external signal may be recorded based on the detection signal. More specifically, in this stage, the frequency value and intensity value of the external signal may be identified based on each of the sequentially outputted frequency detection signal and intensity detection signal. The identified frequency value and intensity value may be recorded in the form of a detection value.

In this stage, detection values acquired during one sweep may be recorded as one detection value set. For example, this stage may be implemented by recording detection values indicating the frequency value and intensity value identified by the signal discrimination portion 520 in the detection value database 530.

When implemented by the aforementioned detector 1, the frequency of the first local signal and the frequency of the second local signal that are the bases of the output of the detection signal in this stage may be recorded together with the detection value. For example, the frequency of the first local signal and the frequency of the second local signal that are the bases of the output of the detection signal may be recorded in the detection value database 530 by the information processing portion 500.

In the comparison of the frequency (S160), when there is a target detection value indicating a threshold intensity or more among the detection values recorded in the recording of the detection value for the external signal (S150), the corresponding signal and the filtering frequency may be compared.

Herein, the threshold intensity may be set in consideration of signal intensity of noise that may be negligible in a general environment. For ease of understanding, various noise signals may be received by the detector even when there is no special signal generating device nearby. This noise signal may be different from the aforementioned frequency modulation signal, and may be generated from a signal source located in a very remote place or naturally generated. These noise signals may usually correspond to very weak signals.

Accordingly, the detector may be operated by considering that there is no external signal when only a signal having an intensity less than the experimentally identified threshold value is present. Hereinafter, the signal intensity for negligible noise is referred to as a general noise intensity value. For example, the general noise intensity value may be pre-recorded and set in the information processing portion 500, and this stage may be implemented by comparing the general noise intensity value recorded by the information processing portion 500 with the intensity values of the detection values.

When there is a target detection value indicating an intensity equal to or higher than the general noise intensity value among the recorded detection values, in this stage, a frequency indicated by the target detection value may be compared with a filtering frequency. For example, such a comparison operation may be implemented by the information processing portion 500.

In this stage, when the frequency indicated by the target detection value does not correspond to the filtering frequency, stages illustrated in FIG. 4 may be executed. Alternatively, when the frequency indicated by the target detection value corresponds to the filtering frequency, the stages illustrated in FIG. 6 may be executed. Herein, the matter that the filtering frequency corresponds to the frequency of the target detection value may mean a case in which both frequencies coincide or have a difference within a preset error range.

First, FIG. 4 is a flowchart for a case where the frequency of the target detection value does not correspond to the filtering frequency in the comparison of the frequency.

As illustrated in FIG. 4, when the frequency indicated by the target detection value does not correspond to the filtering frequency, checking a local signal frequency (S210), fixing the local signal frequency (S220), and discriminating an external signal (S230) may be performed. In addition, according to the result of the discrimination of the external signal (S230), notifying a target signal detection (S240) or recording a filtering frequency (S250) may be performed.

In the checking of the local signal frequency (S210), frequencies of local signals that are the bases of the detection signal for recording the target detection value may be checked. Herein, the detection signal for recording the target detection value may mean a frequency detection signal and an intensity detection signal for recording the target detection value. In addition, as described above, the frequency of the local signal that is the basis of the detection signal may mean the frequency of the local signal oscillated when the detection signal is output. This stage may be implemented by the information processing portion 500 identifying the frequency of the first local signal and the frequency of the second local signal associated with the target detection value in the detection value database 530.

In the fixing of the local signal frequency (S220), the frequency of the local signal may be fixed to the frequency checked in the checking of the local signal frequency (S210). For example, when the method for detecting the continuous wave signal of the detector according to an embodiment of the present disclosure is performed using the detector 1 according to an embodiment of the present disclosure, in this stage, each of the frequency of the first local signal and the frequency of the second local signal may be fixed to the frequency checked in the checking of the local signal frequency (S210). The fixing of the local signal frequency (S220) may be performed for a predetermined time. For example, frequency fixing may be done for a few microseconds or less. The frequency fixing of the local signal may be implemented under the control of the control portion 510.

In the discrimination of the external signal (S230), the frequency of the local signal is fixed in the fixing of the local signal frequency (S220) to generate a second processing signal of the detection band, thereby outputting the detection signal. In this stage, based on the output detection signal, it may be discriminated whether the currently received external signal is a continuous wave signal or a frequency modulation signal. A method for discriminating an external signal in this stage will be described later in detail with reference to FIGS. 7 to 10. The discrimination of the external signal (S230) may be implemented as information processing by the signal discrimination portion 520, for example.

When the external signal being received is discriminated as a continuous wave signal in the discrimination of the external signal (S230), the notification of the target signal detection (S240) may be performed. In the notification of the target signal detection (240), a user may be notified that a target external signal has been detected. For example, this stage may be implemented by outputting a notification by the notification portion 550.

When the external signal being received in the discrimination of the external signal (S230) is discriminated as a frequency modulation signal, the recording of the filtering frequency (S250) may be performed. In the recording of the filtering frequency (S250), the frequency of the external signal being received may be recorded as the filtering frequency. For example, this stage may be implemented by the information processing portion 540 recording the frequency of the signal discriminated as the frequency modulation signal in the filtering database 540.

Figure 5:
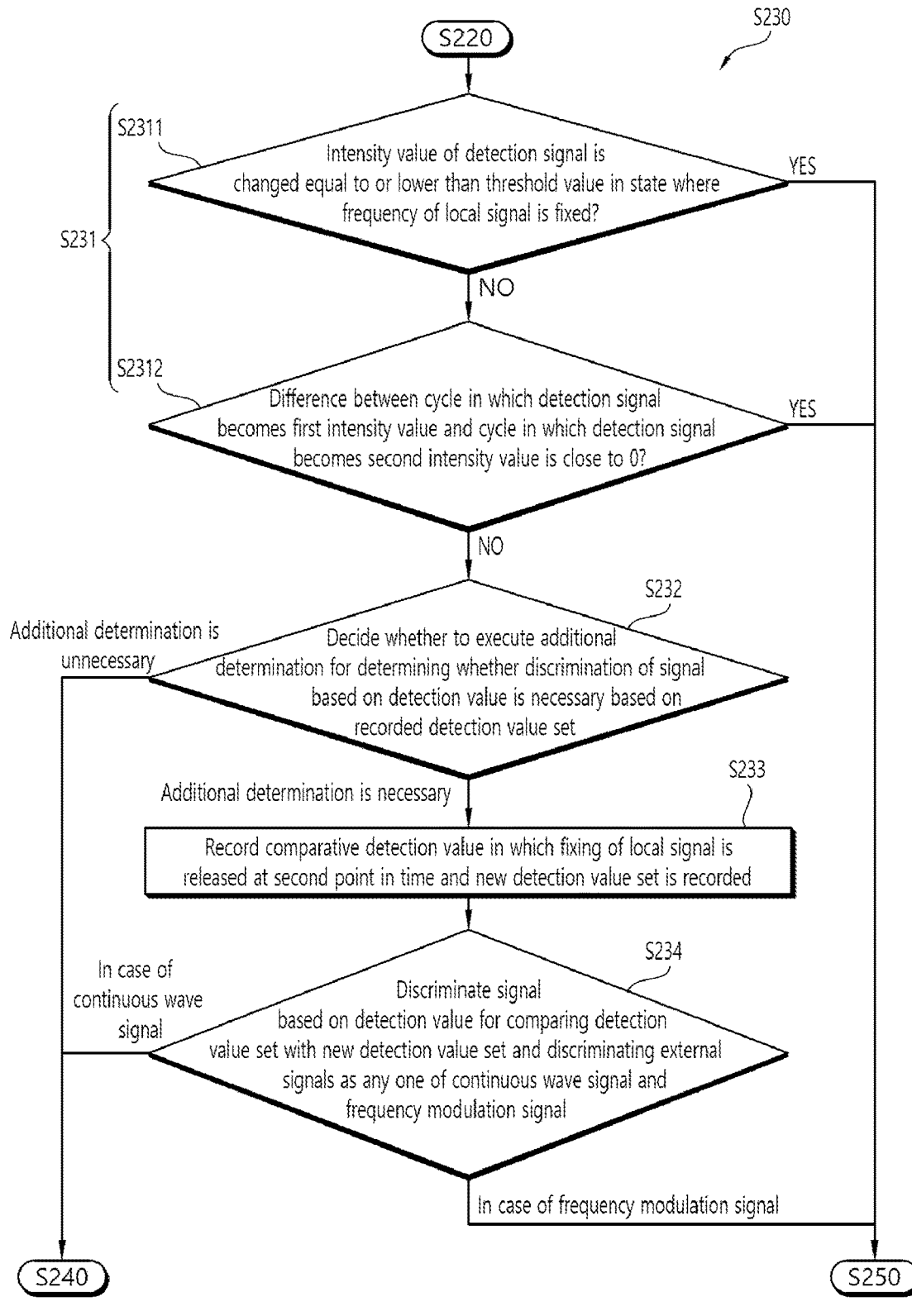

Hereinafter, referring to FIG. 5, the discrimination of the external signal (S230) will be described in detail. FIG. 5 is a flowchart of the discrimination of the external signal. As illustrated in FIG. 5, the discrimination of the external signal (S230) may include: filtering a frequency modulation signal (S231); deciding whether to execute an additional determination (S232); recording a comparative detection value (S233); and discriminating a signal based on a detection value (S234).

In the filtering of the frequency modulation signal (S231), the received external signal may be discriminated with the frequency of the local signal fixed in the fixing of the local signal frequency (S220). The filtering of the frequency modulation signal (S231) may be subdivided into filtering a first frequency modulation signal (S2311) and filtering a second frequency modulation signal (S2312).

In the filtering of the first frequency modulation signal (S2311), it may be discriminated whether the external signal being received is a frequency modulation signal according to whether the intensity value of the detection signal is changed equal to or lower than a threshold value. In this stage, when the external signal is discriminated as a frequency modulation signal, the recording of the filtering frequency (S250) may be performed. Alternatively, in this stage, when the external signal is not discriminated as a frequency modulation signal, the filtering of the second frequency modulation signal (S2312) may proceed.

In the filtering of the second frequency modulation signal (S2312), it may be discriminated whether the external signal being received is a frequency modulation signal based on the cycle of the first intensity value and the second intensity value of the detection signal. Likewise, when the external signal is discriminated as a frequency modulation signal in this stage, the recording of the filtering frequency (S250) may be performed. Alternatively, in this stage, when the external signal is not discriminated as a frequency modulation signal, the decision on whether to execute the additional determination (S232) may be performed.

A detailed description of the filtering of the frequency modulation signal (S231) will be described later with reference to FIGS. 7 to 9.

In the decision on whether to execute the additional determination (S232), it is possible to determine whether the discrimination of the signal based on the detection value (S234) is necessary based on the recorded detection value set. In this stage, when it is determined that the discrimination of the signal based on the detection value (S234) is unnecessary, the notification of the target signal detection (S240) may be performed. In contrast, in this stage, when it is determined that the discrimination of the signal based on the detection value (S234) is necessary, the recording of the comparative detection value (S233) may be performed.

The decision on whether to execute the additional determination (S232) may be prepared for the case where the frequency modulation signal is higher than the general noise intensity value mentioned in the comparison of the frequency (S160), but the signal is received at a relatively weak intensity or the output of the detection signal is not constant due to other noises therearound. In this connection, the frequency modulation signal may not be filtered in the filtering of the frequency modulation signal (S231).

As a first criterion, in the decision on whether to execute the additional determination (S232), when there are a plurality of external signals having a frequency included in the detection band in the detection value set and having an intensity equal to or higher than a preset threshold intensity, it may be determined that the discrimination of the signal based on the detection value (S234) is necessary.

The threshold intensity mentioned herein may be the same as or similar to the general noise intensity value. This is because, in general, since a continuous wave signal has one frequency, there is a possibility that it is not a continuous wave signal in this connection.

As a second criterion, in the decision on whether to execute the additional determination (S232), when an average intensity of the detection value set is equal to or higher than a preset reference average intensity, it may be determined that the discrimination of the signal based on the detection value (S234) is necessary. Herein, the reference average intensity may represent a generally anticipated intensity value in a situation where a continuous wave signal is received without a frequency modulation signal.

The reference average intensity may be identified experimentally using a signal to be detected. For example, when a signal to be detected is a signal for providing road information, an appropriate value may be selected by measuring the intensity of the corresponding signal. As another example, when a signal to be detected is a speed gun signal, an appropriate value may be selected by measuring the intensity of the corresponding signal. In general, since a frequency modulation signal by CAS or cell tower received by a vehicle corresponds to a stronger signal than the aforementioned signals, when the average intensity of a signal becomes equal to or higher than the reference average intensity, the corresponding signal may be highly likely to be a signal of a frequency modulation method.

In this connection, the first criterion and the second criterion may be set to an AND condition or an OR condition. In the case of the AND condition, the discrimination of the signal based on the detection value (S234) may be performed only when both the first criterion and the second criterion are satisfied. In the case of the OR condition, when any one of the first criterion and the second criterion is satisfied, the discrimination of the signal based on the detection value (S234) may be performed.

The recording of the comparative detection value (S233) may be performed when it is determined that the discrimination of the signal based on the detection value (S234) in which additional discrimination is performed is necessary in the decision on whether to execute the additional determination (S232).

In the recording of the comparative detection value (S233), the movement of the local signal frequency (S120), the processing of the external signal (S130), the sequential outputting of the detection signal (S140), and the recording of the detection value for the external signal (S150) may be repeatedly performed.

To this end, in this stage, the frequency fixing of the local signal may be released at a second point in time. Herein, the second point in time may be a point in time after it is determined that additional determination is necessary in the decision on whether to execute the additional determination (S232).

In this stage, a band including a frequency indicated by the target detection value may be swept once again, and a new detection value set therefor may be recorded. For example, in this stage, the first frequency oscillation portion 220 may once again sweeps a band including the frequency of the first local signal that is the basis of the detection signal, and the second frequency oscillation portion 320 may be implemented by fixing the corresponding frequency among the 2a local signal, the 2b local signal, or the 2c local signal.

For example, in this stage, when the external signal that the detector 1 needs to discriminate is an X band, the X band search mode is performed once more. When the external signal is a K band, the K band search mode is performed once more. When the external signal is a Ka band, the Ka band search mode is performed once more.

For this reason, in the recording of the comparative detection value (S233), a detection value set resulting from additional sweep operations may be recorded. For example, a new detection value set may be recorded in the detection value database 530.

Hereinafter, in order to distinguish the detection value set of the recording of the comparative detection value (S233) and the detection value set of the recording of the detection value for the external signal (S150), the former is referred to as a comparative detection value set and the latter is referred to as an existing detection value set. Alternatively, one of the two may be referred to as a first detection value set and the other may be referred to as a second detection value set.

Further, the processing signal for the comparative detection value set is referred to as a comparison processing signal, and the detection signal for the comparative detection value set is referred to as a comparison detection signal. In this regard, a processing signal for the existing detection value set is referred to as an existing processing signal, and a detection signal for the existing detection value set is referred to as an existing detection signal.

In the discrimination of the signal based on the detection value (S234), it is possible to discriminate whether a signal appearing in the detection value set is a continuous wave signal or a frequency modulation signal by comparing the comparative detection value set with the existing detection value set.

Thereafter, in this stage, when the external signal is discriminated as a continuous wave signal, the notification of the target signal detection (S240) may be performed, and when the external signal is discriminated as a frequency modulation signal, the recording of the filtering frequency (S250) may be performed.

The basis for determining the external signal based on the comparative detection value set and the existing detection value set acquired temporally differently at the first point in time and the second point in time in the above description may be as follows.

It may take between several microseconds and several seconds for the stages included in the method for detecting the continuous wave signal of the detector according to an embodiment of the present disclosure to be performed all once. Accordingly, in the above description, the sequentially received external signal and the external signal after the fixing of the local signal frequency (S220) may actually be the same signal output from one device. In other words, when a specific signal is present outside the detector for several seconds, the external signals distinguished above may distinguish the same specific signal according to received time.

Figure 6:
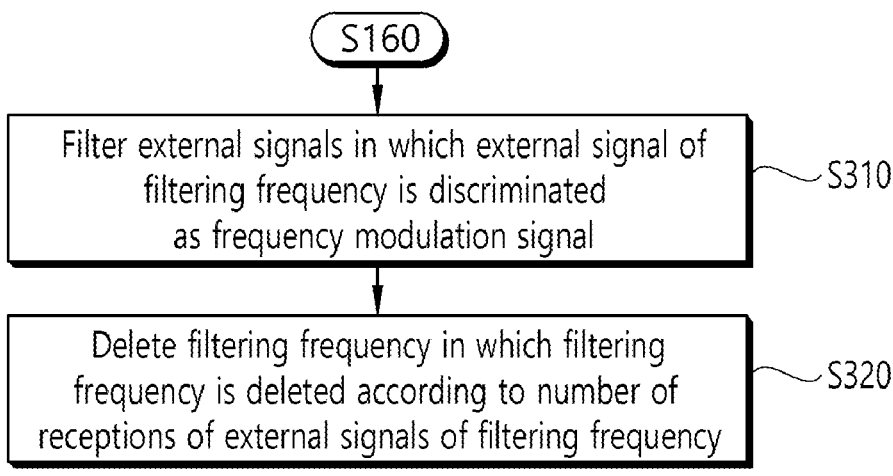

Hereinafter, referring to FIG. 6, a case in which the frequency of the target detection value corresponds to the filtering frequency in the comparison of the frequency (S160) will be described. FIG. 6 is a flowchart for a case in which the frequency of the target detection value corresponds to the filtering frequency in the comparison of the frequency.

When the frequency indicated by the target detection value in the comparison of the frequency (S160) is the filtering frequency, the filtering of the external signal (S310) may be performed. In the filtering of the external signal (S310), the received external signal may be regarded as a frequency modulation signal and may be negligible. In addition, in this stage, based on the reception of an external signal of the filtering frequency, information on the filtering frequency recorded in the database may be corrected and recorded.

For example, this stage may be implemented by the information processing portion 500 filtering the received external signal as a frequency modulation signal, and changing and recording the number of receptions of the filtering frequency recorded in the filtering database 540. In this connection, the information processing portion 500 may change the recorded data so that the number of receptions is increased by one.

The deletion of the filtering frequency (S320) may be performed when the number of receptions coincides with the number of repeated receptions. In this stage, filtering frequencies received as many times as the number of repeated receptions may be deleted. For example, this stage may be implemented by the information processing portion 500 deleting from the filtering database 540 a filtering frequency coinciding with the frequency of the received external signal as many times as the number of repeated receptions.

Hereinafter, the filtering of the frequency modulation signal (S231) will be described in detail with reference to FIGS. 7 to 9. FIGS. 7 to 9 are graphs representing frequency detection signals in a state in which a frequency of a local signal is fixed.

Figure 7:
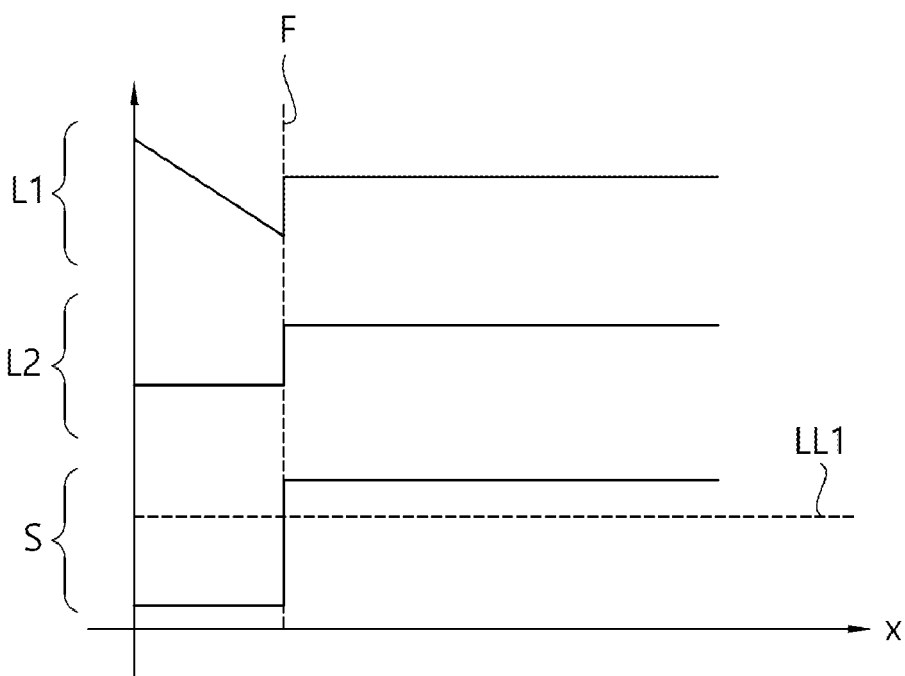
FIGS. 7, 8, and 9 are graphs representing frequency detection signals in a state in which a frequency of a local signal is fixed.
Figure 8:
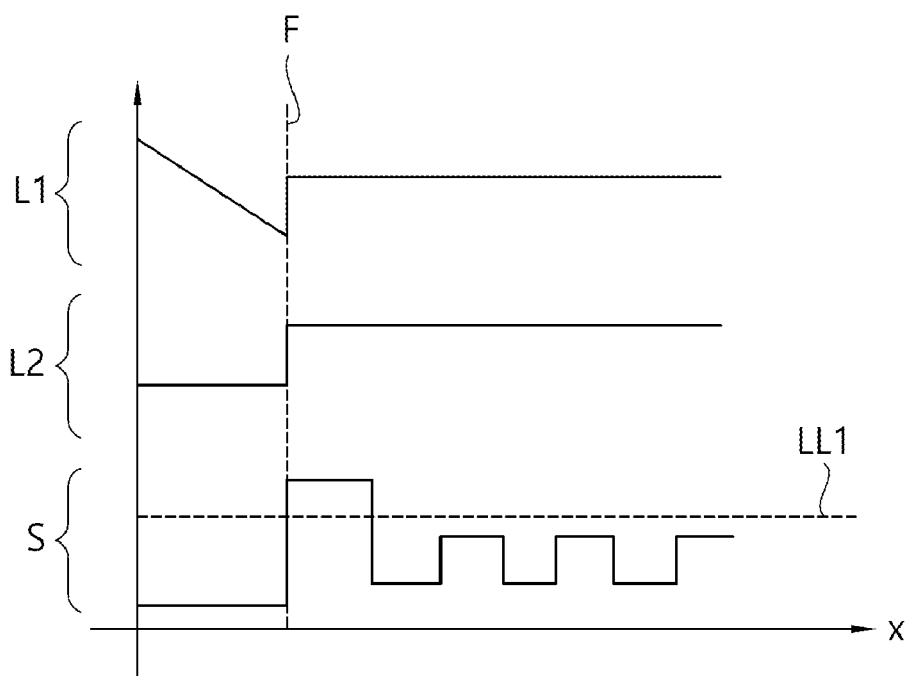
Figure 9:
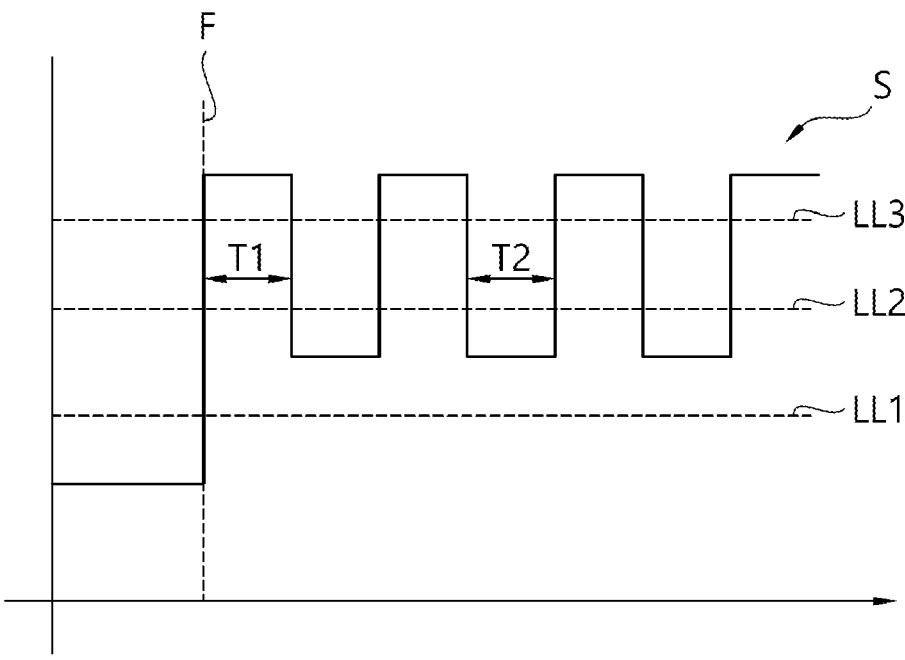

In FIGS. 7 to 9, an x-axis may mean time. In addition, the graph of the L1 section in FIGS. 7 to 9 represents the value of a frequency of the first local signal. In addition, the graph of the L2 section represents the value of a frequency of the second local signal. In addition, the dotted lines indicated by F in FIGS. 7 to 9 represent the point of time when the first local signal and the second local signal are fixed. In addition, the graph of the section indicated by S in FIGS. 7 and 8 and the graph indicated by S in FIG. 9 represent the intensity of the frequency detection signal over time.

<Filtering of Frequency Modulation Signal>

First, in the filtering of the first frequency modulation signal (S2311), after the frequency of the local signal is fixed (after point F), it may be determined whether the intensity S of the frequency detection signal is maintained equal to or higher than a threshold value LL1.

Herein, the threshold value LL1 may be an intensity value of a frequency detection signal when a continuous wave signal having a reference frequency is received by the detector. Herein, the reference frequency is lower than the frequency of the continuous wave signal (hereinafter referred to as a target signal) targeted for detection, but may be set to a higher frequency among frequencies included in frequency modulation signals generated by major noise generating devices such as CAS equipment. The threshold value LL1 and the reference frequency may be appropriately selected through experimentally acquired data.

In this connection, before time point F, the local frequency may be being swept. When the frequency is fixed in the fixing of the local signal frequency (S220), after time point F, the frequency L1 of the first local signal may be fixed to the base frequency of the detection signal, and the frequency L2 of the second local signal may be fixed to a frequency corresponding to the 2a local signal, the 2b local signal, and the 2c local signal.

Prior to the frequency fixing time point F, the second processing signal may not be in the detection band. For this reason, as illustrated in FIGS. 7 to 9, the frequency detection signal may have the lowest value before the frequency fixing time point F. For example, the lowest value may be 0, and the frequency detection signal may not be output before the frequency fixing time point F.

When a target signal (an external signal of a frequency to be detected) is received by the detector, the intensity of the frequency detection signal may change in a form similar to an aspect of a graph S of FIG. 7 while the frequency is fixed. In this connection, since the frequency of the external signal changes within a certain error range, the intensity value graph S of the frequency detection signal may be drawn in a substantially straight line shape equal to or higher than the threshold value LL1.

In contrast, the signal of the frequency modulation method may appear in a form similar to FIG. 8 as the intensity graph S of the frequency detection signal. This may be because the frequency of the frequency modulation signal changes over time and becomes lower than the reference frequency.

Taking the detector 1 according to an embodiment of the present disclosure described above as an example, after the frequency is fixed, the signal discrimination portion 520 may determine the external signal as a frequency modulation signal when the intensity of the frequency detection signal is not maintained equal to or higher than the threshold value LL1. When the signal determination portion 520 discriminates that the external signal is a frequency modulation signal, the frequency indicated by the detection value may be recorded as the filtering frequency.

The filtering of the second frequency modulation signal (S2312) may be performed when the external signal is not discriminated as a frequency modulation signal in the filtering of the first frequency modulation signal (S2311). When the external signal is discriminated as the frequency modulation signal in the filtering of the first frequency modulation signal (S2311), this stage may not proceed and the recording of the filtering frequency (S250) may be performed.

The filtering of the second frequency modulation signal (S2312) considers the case where the frequency modulation signal has a high frequency range and a detection signal equal to or higher than the threshold value LL1 is always output. Continuing the description with reference to FIG. 9, in this stage, a first intensity value LL3 and a second intensity value LL2 may be additionally decided. The first intensity value LL3 and the second intensity value LL2 may be experimentally determined and set. Alternatively, the first intensity value LL3 and the second intensity value LL2 may be arbitrarily set after an information processing unit built in the detector observes the amplitude of the detection signal.

The first intensity value LL3 and the second intensity value LL2 are intensity values higher than the threshold value LL2, and the first intensity value LL3 may be an intensity value higher than the second intensity value LL2. In this stage, a cycle T1 in which the first intensity value LL3 repeatedly appears and a cycle T2 in which the second intensity value LL2 repeatedly appears in the intensity change S of the detection signal may be compared. For example, this comparison may be processed by the signal discrimination portion 520.

In this stage, when a difference value between the two cycles T1 and T2 is close to 0, the corresponding signal may be discriminated as a frequency modulation signal. This may be in consideration of the periodic change of the frequency modulation signal. In addition, this may be based on consideration that realistically, the continuous wave signal may be mixed with external noise so that the detection signal may somewhat vibrate, and in this connection, the detection signal will not change periodically. In this stage, when the external signal is discriminated as a frequency modulation signal, the recording of the filtering frequency (S250) may be performed.

<Method for Comparing Comparison and Discrimination>

Figure 10A:
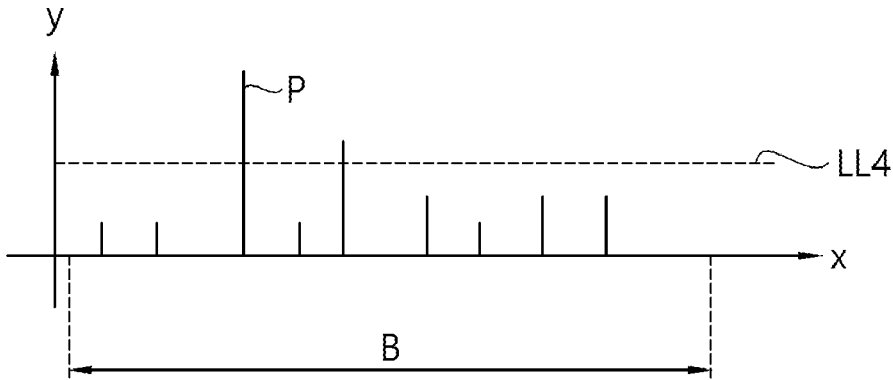
FIGS. 10a and 10b are bar graphs each representing detection values included in a detection value set.
Figure 10B:
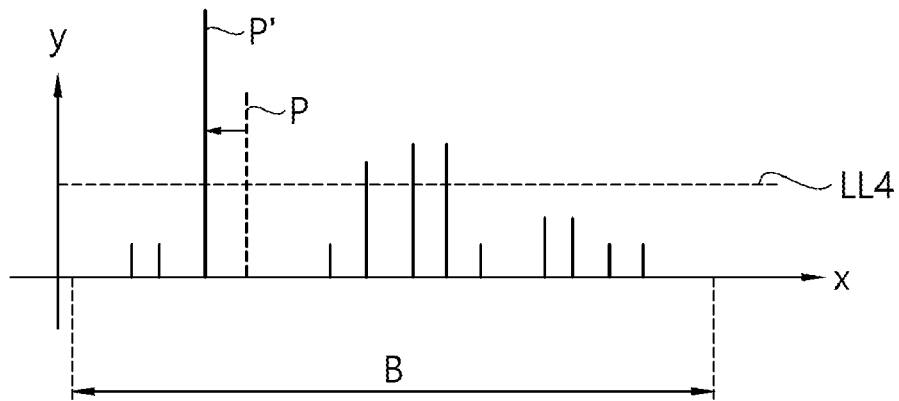

In order to aid understanding in describing the discrimination of the signal based on the detection value (S234), FIGS. 10a to 10b will be described first. FIGS. 10a to 10b is a bar graph representing detection values included in a detection value set. In more detail, FIG. 10a shows detection values included in the existing detection value set as a bar graph, and FIG. 10b shows detection values included in the comparative detection value set as a bar graph. In FIGS. 10a to 10b, an x-axis may be frequency and a y-axis may be signal intensity.

During actual driving of a car, CAS equipment that causes noise may move away from the car and may momentarily have a somewhat weak signal. In this connection, the reception of the external signal may not be constant, and thus the detection signal may not be continuously output. Such discontinuous output of the detection signal may make it difficult to effectively filter in the filtering of the frequency modulation signal (S231).

In preparation therefor, in the discrimination of the signal based on the detection value (S234), an external signal is discriminated by comparing the existing detection value set and the comparative detection value set. A method for discriminating a signal in the discrimination of the signal based on the detection value (S234) may be as follows.

First, in a first method, when the frequency of a signal having the maximum intensity among external signals having a frequency of the detection band (B) is changed, the corresponding signal may be discriminated as a frequency modulation signal.

Specifically, in this stage, a detection value (P in FIG. 10$a$) indicating the maximum intensity among detection values of an existing detection value set may be searched. When a detection value P having the maximum intensity is identified, the frequency (first frequency) of the external signal indicated by the detection value P may be identified.

Thereafter, a similar operation may also be performed on a comparative detection value set. A detection value (P' in FIG. 10$b$) indicating the maximum intensity in the comparative detection value set may be searched, and a frequency (second frequency) indicating the detection value P' may be identified.

When the first frequency and the second frequency identified in this stage are different, it may be discriminated that the signal of the first frequency and the signal of the second frequency originate from one frequency modulation signal. In other words, such a frequency movement may be identified as a movement in frequency over time according to the characteristics of a frequency modulation signal. Accordingly, the first frequency and the second frequency may be recorded as filtering frequencies.

A second method may be a method of comparing average intensity and maximum intensity between an existing detection value set and a comparative detection value set.

In this stage, an average intensity value (first average intensity value) of external signals may be calculated using detection values of an existing detection value set having a frequency of the detection band (B). Similarly, in this stage, the average intensity value (second average intensity value) of the external signals may be calculated using the detection values of the comparative detection value set having the frequency of the detection band (B). In addition, in this stage, the maximum intensity value (P: the first maximum intensity value) in the existing detection value set and the maximum intensity value (P'; the second maximum intensity value) in the comparative detection value set may each be identified.

In this connection, in this stage, when the first average intensity value and the second average intensity value are different and the first maximum intensity value and the second maximum intensity value are different, it may be identified that the signals recorded in the detection value set originate from the frequency modulation signal. This may be in consideration of the fact that, in the case of noise caused by a frequency modulation signal generating device such as CAS equipment, the signal intensity may change greatly.

In this connection, in a plurality of detection value sets, all of the frequencies of external signals equal to or higher than a predetermined threshold intensity LL4 may be recorded as the filtering frequency. Herein, the preset threshold intensity LL4 may be the aforementioned reference average intensity or general noise intensity value.

In the discrimination of the signal based on the detection value S234, external signals appearing in the detection value set may be discriminated using both the first method and the second method. In this connection, when it is determined that there is no frequency modulation signal by the first method (signals of the maximum intensity are the same or within the error range) and it is determined that there is no frequency modulation signal by the second method (the average intensity and the maximum intensity are not different at the same time or have a difference within the error range), the external signal may be discriminated as a continuous wave signal.

A series of information processing described above may be performed by the information processing portion 500.

Those skilled in the technical field to which the present disclosure pertains will understand that the present disclosure may be practiced in other detailed forms without departing from the technical spirit or essential features of the present disclosure. Accordingly, it should be understood that the above-described embodiments are exemplary in all aspects rather than being restrictive. The scope of the present disclosure is defined by the following claims rather than by the detailed description of the embodiment. It shall be understood that all modifications and embodiments conceived from the meaning and scope of the claims and their equivalents are included in the scope of the present disclosure.

DESCRIPTION OF REFERENCE NUMERALS

| | |
|---|---|
| 1: Detector | 100: Receiver |
| 210: First signal processing portion | 212: First mixer |
| 214: First amplifier | 220: First frequency oscillation portion |
| 222: First frequency oscillator | 224: Sweep oscillator |
| 310: Second signal processing portion | 312: Second amplifier |
| 314: Second mixer | 316: Band pass filter |
| 320: Second frequency oscillation portion | 322: Second frequency oscillator |
| 324: Third frequency oscillator | 326: Fourth frequency oscillator |
| 400: Signal detector | 410: Signal analyzer |
| 420: AD converter | 500: Information processing portion |
| 510: Control portion | 520: Signal discrimination portion |
| 530: Detection value database | 540: Filtering database |
| 550: Notification portion | |

What is claimed is:

1. A method for detecting a continuous wave signal of a detector, the method comprising:

moving a local signal frequency in which the detector sequentially oscillates local signals of each different frequency;

processing external signals in which processing signals are sequentially generated based on the sequentially oscillated local signals and the external signals sequentially received during the movement of the local signal frequency;

checking the local signal frequency in which a frequency of the local signal that causes the processing signals, among the processing signals sequentially generated, having a frequency of a detection band detected by the detector to be generated is checked;

fixing the frequency of the local signal with the frequency checked in the checking of the local signal frequency;

discriminating the external signals in which a detection signal is output based on the processing signals having the frequency of the detection band, and the detected external signals are discriminated as any one of a continuous wave signal and a frequency modulation signal based on the detection signal; and notifying target signal detection outputting a notification based on the discrimination that the detected external signals are continuous wave signals, wherein:

the detection signal has an intensity value based on a frequency of the processing signals and the discrimination of the external signals comprises filtering the frequency modulation signal discriminating the external signals as the frequency modulation signal when the intensity value of the detection signal is changed equal to or lower than a preset threshold value.

2. The method of claim 1, wherein:

the intensity value comprises a first intensity value based on the frequency of the processing signals and a second intensity value lower than the first intensity value; and the discrimination of the external signals further comprises filtering the frequency modulation signal discriminating the external signals as the frequency modulation signal based on a difference between a cycle in which the intensity value of the detection signal becomes the first intensity value and a cycle in which the intensity value of the detection signal becomes the second intensity value.

3. The method of claim 1, further comprising:

sequentially outputting the detection signal in which a plurality of the detection signals are output based on the processing signals sequentially generated in the processing of the external signals; and recording a detection value for the external signals in which a plurality of detection values indicating a frequency and intensity of any one of the detected external signals, respectively, based on each of the plurality of detection signals, and a detection value set including the plurality of detection values are recorded, wherein the discrimination of the external signals further comprises:

recording a comparative detection value in which a new detection value set is recorded by repeating the movement of the local signal frequency, the processing of the external signals, the sequential outputting of the detection signal, and the recording of the detection value for the external signals; and discriminating a signal based on the detection value for comparing the detection value set with the new detection value set and discriminating the detected external signals as any one of the continuous wave signal and the frequency modulation signal.

4. The method of claim 3, wherein, in the discrimination of the signal based on the detection value, when a first frequency of the detected external signals having a maximum intensity in the detection value set differs from a second frequency of the detected external signals having a maximum intensity in the new detection value set, at least one of the detected external signals having the first frequency and the detected external signals having the second frequency is discriminated as the frequency modulation signal.

5. The method of claim 3, wherein, in the discrimination of the signal based on the detection value, when an average intensity of the detection value set differs from an average intensity of the new detection value set, and a maximum intensity in the detection value set differs from a maximum intensity in the new detection value set, in the detection value set and the new detection value set, the detected external signals having an intensity equal to or higher than a preset threshold intensity is discriminated as the frequency modulation signal.

6. The method of claim 3, wherein, when the detected external signals are not discriminated as the frequency modulation signal in the filtering of the frequency modulation signal, the discrimination of the external signals further comprises deciding whether to execute an additional determination determining whether the discrimination of the signal based on the detection value is necessary.

7. The method of claim 6, wherein, when the number of detection values indicating an intensity equal to or higher than a preset threshold intensity among the plurality of detection values is plural, the decision of whether to execute the additional determination determines that the discrimination of the signal based on the detection value is necessary.

8. The method of claim 6, wherein, when an average intensity of the detection value set is equal to or higher than a preset reference average intensity, the decision of whether to execute the additional determination determines that the discrimination of the signal based on the detection value is necessary.

9. The method of claim 6, wherein, in the discrimination of the external signals, the external signal is discriminated as the continuous wave signal based on the determination that the discrimination of the signal based on the detection value is not necessary in the decision of whether to execute the additional determination.

10. The method of claim 1, further comprising:

recording a filtering frequency in which a frequency of the detected external signal discriminated as the frequency modulation signal is recorded as the filtering frequency; and filtering the external signals in which a newly detected external signal having the filtering frequency is discriminated as the frequency modulation signal.

11. The method of claim 10, further comprising deleting the filtering frequency in which the recorded filtering frequency is deleted when the external signals of the filtering frequency are detected a preset number of times or more.

12. A detector for detecting a continuous wave signal, the detector comprising:

a receiver for receiving an external signal;

a frequency oscillator for oscillating a local signal;

a signal processing portion for generating a processing signal based on the local signal and the external signal;

a signal detector for outputting a detection signal based on the processing signal when the processing signal has a frequency in a detection band;

a control portion for controlling the frequency oscillator to sequentially change a frequency of the local signal in a preset band or fixing the frequency of the local signal to a frequency at which a frequency of the processing signal is the frequency in the detection band;

a signal discrimination portion for discriminating the external signal as any one of a continuous wave signal and a frequency modulation signal based on the detection signal in a state in which the frequency of the local signal is fixed; and a notification portion for outputting a notification based on the discrimination that the external signal is the continuous wave signal;

wherein:

the detection signal has an intensity value based on a frequency of the processing signals and the signal discrimination portion discriminates the external signals as the frequency modulation signal when the intensity value of the detection signal is changed equal to or lower than a preset threshold value.

* * * * *